(12) United States Patent
Hughes et al.

(10) Patent No.: US 7,882,358 B2
(45) Date of Patent: Feb. 1, 2011

(54) REVERSIBLE HASHING FOR E-SIGNATURE VERIFICATION

(75) Inventors: Aidan T. Hughes, Bellevue, WA (US); Vladimir Tankovich, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 11/623,188

(22) Filed: Jan. 15, 2007

(65) Prior Publication Data
US 2008/0172560 A1    Jul. 17, 2008

(51) Int. Cl.
*H04L 9/32* (2006.01)
*G06F 7/04* (2006.01)

(52) U.S. Cl. .......................... 713/176; 713/175; 726/27
(58) Field of Classification Search ................. 713/176, 713/175; 726/26
See application file for complete search history.

(56) References Cited

U.S. PATENT DOCUMENTS

| | | | |
|---|---|---|---|
| 5,343,527 A * | 8/1994 | Moore | 713/179 |
| 5,745,574 A * | 4/1998 | Muftic | 713/157 |
| 5,892,829 A | 4/1999 | Aiello et al. | |
| 6,128,737 A | 10/2000 | Jakubowski et al. | |
| 6,711,680 B1 | 3/2004 | Cordery | |
| 6,851,052 B1 | 2/2005 | Graveman | |
| 6,928,162 B1 | 8/2005 | Heddes et al. | |
| 6,959,384 B1 | 10/2005 | Serret-Avila | |
| 6,976,162 B1 | 12/2005 | Ellison et al. | |
| 6,976,165 B1 | 12/2005 | Carpentier et al. | |
| 2003/0046566 A1 * | 3/2003 | Holopainen | 713/193 |
| 2003/0084308 A1 | 5/2003 | Van Rijnswou | |
| 2004/0064704 A1 * | 4/2004 | Rahman | 713/182 |
| 2005/0210260 A1 | 9/2005 | Venkatesan et al. | |
| 2009/0003597 A1 * | 1/2009 | Gantman et al. | 380/44 |

OTHER PUBLICATIONS

Oehler et al., HMAC-MD5 IP Authentication with Replay Prevention, Feb. 1997, RC#2085.
Bellare et al., Breaking and provably repairing the SSH authenticated encryption scheme: A case study of the Encode-then-Encrypt-and-MAC paradigm, ACM Transactions on ISS, vol. 7(2), May 2004, pp. 206-241.
Preneel, Bart, The State of Cryptographic Hash Functions, Lectures on Data Security, pp. 158-182, (1999).

* cited by examiner

*Primary Examiner*—Kambiz Zand
*Assistant Examiner*—Michael Guirguis
(74) *Attorney, Agent, or Firm*—Merchant & Gould P.C.

(57) ABSTRACT

Embodiments of the present invention relate to systems and methods to authenticate software licenses. One embodiment of the present invention comprises a method where a vendor creates a reversible hash from a known, predetermined seed value, encrypts the hash to generate a digital signature, and sends the digital signature to the customer. The customer enters the digital signature. The customer's client computer reverses the reversible hash to obtain a determined seed value. The client has access to the known seed value used by the vendor. The known seed value is compared to the determined seed value. If the seed values compare, the software license and the associated software is authenticate.

19 Claims, 7 Drawing Sheets

REVERSIBLE HASHING FOR E-SIGNATURE VERIFICATION

BACKGROUND

Generally, software vendors deliver licensed software either on a compact disk or by a download over the Internet. To ensure that the software and the associated software license are authenticate, the software vendor in many situations requires the customer to enter a vendor-provided e-signature, also referred to herein as a digital signature, into the customer's computer. The vendor, in some situations, may provide the digital signature over the telephone, which requires a less lengthy digital signature to be used. The vendor-delivered digital signature is then compared to a digital signature created at the customer's computer. If the digital signatures match, the software license is valid and the customer can begin to use the software. The digital signatures are generally created with the same or similar information but are created separately at the vendor and the customer. The customer created digital signature uses similar mathematical or other functions as the vendor that created the signature, that is, the customer's computer mimics the operations at the vendor used to create the digital signature. In some environments, it may be preferred to authenticate the license without comparing separately-created digital signatures, such as when less lengthy digital signature are used.

SUMMARY

The described embodiments generally relate to new and alternate systems and methods to authenticate software licenses using a reversible hash value. A customer may request authorization to use a software package. As such, the software license for the software is authenticated. More particularly, the vendor creates a reversible hash from a known and predetermined seed value and the license data being authenticated, encrypts the reversible hash to generate a digital signature, and sends the digital signature to the customer. The customer enters the digital signature. The customer's computer decrypts and then "reverses" the reversible hash value using the license data to obtain a determined seed value. The unit of software the customer wants to install includes the seed value used by the vendor. This known seed value is compared to the determined seed value. If the seed values compare, i.e., are the same, the software and the associated software license is authenticate. The customer is then authorized to use the software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
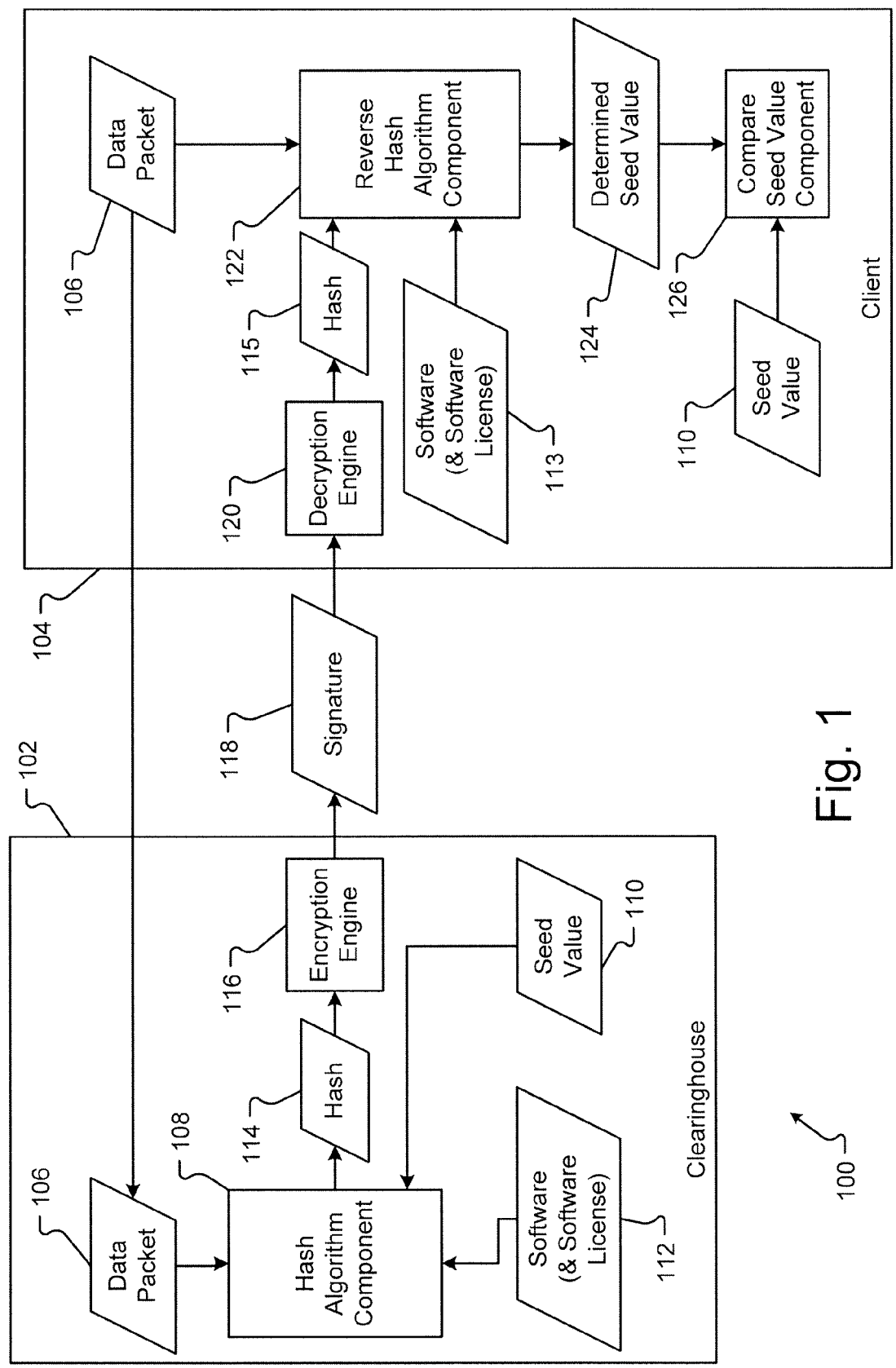
FIG. 1 is a block diagram of an embodiment of a system for reversing the reversible hash of a software license.

This disclosure will now more fully describe some embodiments with reference to the accompanying drawings, in which only some of the possible embodiments are shown. Other aspects may be embodied in many different forms and should not be construed as limited to the embodiments set forth herein. Rather, these embodiments are provided so that this disclosure will convey the scope of the possible embodiments to those skilled in the art.

Embodiments of the present invention relate to new and alternate methods and systems for verifying the authenticity of software licenses. Generally, software licenses are required to use a software package legally. Many software vendors prevent software piracy by ensuring the software used by a customer and the accompanying software license are authenticated using a verification process. In one embodiment, the customer who purchased a software package must enter a correct e-signature, i.e., a digital signature, and possibly license data into the customer's computer during installation of the software package. If the digital signature is correct, the software installs and/or executes. In one embodiment, the digital signature is an encrypted hash value.

A hash value or hash can be a unique value or sequence of numbers or symbols. In one embodiment, a vendor generates the reversible hash from a predetermined seed value, one or more items of information known to both the vendor and the customer, and one or more algorithms applied to the seed value and/or the known information. The predetermined seed value can be a numeric value or array of bits that is the same for all software packages of the same type distributed by the software vendor. A seed value is, in embodiments, the initial value used to generate the hash. The information known to the vendor and the customer may be the type of software package, a software serial number, one or more descriptors of the customer's computer that the customer communicates to the vendor, the time, the date, the customer's identity, where the software was purchased, the license expiration date communicated to customer, etc.

In one embodiment, the reversible hash is created at a software vendor with a first set of one or more algorithms. An algorithm may be a mathematical function, a logic function, or other function. The vendor can create a digital signature from the reversible hash by encrypting the hash value with one or more encryption systems or methods. The vendor then communicates the digital signature to the customer for authentication of the customer's software and the associated software license.

As opposed to the functions at the vendor, the customer's computer decrypts the digital signature to extract the hash. In embodiments, the customer's computer reverses the functions used to create the hash to extract the seed value from the hash using, as inputs to the functions, one or more items of information known to both the vendor and the customer, which, in embodiments, is the information (e.g. the software and/or software license) that is being authenticated. Thus, the customer's computer uses a second set of algorithms, which, in embodiments, is different from the first set of algorithms used by the vendor, to extract the predetermined seed value from the hash.

In embodiments, the customer's computer knows the predetermined seed value for the software license. For example, the predetermined seed value is the same for each of the same type of software packages the vendor sells, and the software package or software license includes the predetermined seed value. In embodiments, the customer's computer compares the predetermined seed value extracted from the hash sent from the vendor with the seed value known from the software package or software license. If the seed values are the same, the software license is authenticated, and the software installs and executes.

An embodiment of a system 100 for providing a digital signature and reversing the process for creating the digital signature at the customer is shown in FIG. 1. The components presented as comprising system 100 in FIG. 1 can be embodied in software, hardware, or a combination of software and hardware. The system 100 may comprise a clearinghouse 102 and a client 104. In embodiments, the clearinghouse 102 is a server computer at the software vendor's facility, and the client is the customer's computer. Server and client computing systems are described in conjunction with FIG. 7.

In embodiments, the clearinghouse 102 creates the reversible hash, encrypts the reversible hash to form the digital signature, and communicates the digital signature to the client 104. The clearinghouse 102, the client 104, and other components described herein may be in electrical communication with each other. Thus, the components may communicate data between one or more components using systems or methods that are operable to perform the functions described herein. Before the clearinghouse 102 constructs the reversible hash, the client 104 may send one or more items of data, represented by data packet 106, to the clearinghouse 102. The one or more items of data may comprise the software package purchased, the customer's identity (e.g., the customer's name, address, social security number, driver's license number, phone number, etc.), the store where the software was purchased, the type or configuration of the computer on which the customer is installing the software, etc. The data packet 106 may be communicated over a network, for example, the Internet, or the individual items of information may be communicated by other systems or means. For example, the customer may provide the information, over the telephone, to a representative of the vendor, and the vendor's representative enters the information into the clearinghouse 102. In alternative embodiments, the clearinghouse 100 also constructs additional items of data, e.g. license expiration date, that the client 104 provides to the software functions that client 104 executes. The additional items of data may be sent to the client 104 before the client 104 can process the digital signature 118. In embodiments, the additional data is sent before, with, or after digital signature 118 is sent to client 104.

One or more items of information, in embodiments, is entered into a hash algorithm component 108. For example, a predetermined seed value 110 is an initial entry into the hash algorithm component 108, and the data packet 106 and one or more other items of information about the software 112 or otherwise may also be entered into the hash algorithm component 108. Every software package of the same type may have the same predetermined seed value 110, which may be included as part of the software code, software metadata, or other information about the software. As an example, a predetermined seed value 110 is the hex value "0123456789ABCDEF." In embodiments, the predetermined seed value 100 operates as the first operand in any function the hash algorithm component 108 executes. The predetermined seed value 110, in embodiments, is known to both the clearinghouse 102 and the client 104 because both the clearinghouse 102 and the client 104 store a copy of the software which includes the predetermined seed value 110 as part of the software code or data.

In embodiments, the data packet 106 or/and the software 112 provides the other operands for a function(s) performed by the hash algorithm component 108. For example, a numeric representation of the customer's phone number is applied to the seed value 110 to derive an interim or final reversible hash. In another example, the software 112 is partitioned into portions having a predetermined size, for example, 16 bit portions. The hash algorithm component 108 can then use one or more of the portions of software to complete functions with the predetermined seed value 110 to create a hash. In one embodiment, data from the software or software license 112 is combined with data from data packet 106 to create a larger data packet, that is, the data added to the data packet 106 grows the larger data packet. The larger data packet is then used to generate the hash 114. The data added to the data packet 106 can be either sent to the client 104 or may be already resident at the client 104.

The hash algorithm component 108 may use the hash created from a first function as the first operand in another function using data from the data packet 106 or/and the software 112 as the second operand. In embodiments, the hash algorithm component 108 executes some predetermined number of functions until a final hash 114 is generated. In one embodiment, the hash algorithm component 108 uses a modified MD5 message-digest algorithm to create hash 114, wherein the modification may be the addition or elimination of one or more processes, algorithms, or functions used in the MD5, the change in order of the one or more processes, algorithms, or functions used in the MD5, or some other change. The MD5 algorithm is explained in "The MD5 Message-Digest Algorithm" by R. Rivest and published April 1992 as RFC1321 of the Network Working Group of the Internet Engineering Task Force, said document is incorporated herein by reference for all that it teaches. Embodiments of the present invention provide a reversible hash by eliminating one or more of the functions, e.g., an AND logic function, executed by the MD5 algorithm or by executing the one or more functions of the MD5 algorithm over two or more iterations.

In embodiments, an encryption engine 116 encrypts the hash 114 to create a digital signature 118. The encryption method may be Pretty Good Privacy (PGP) public key encryption, RSA encryption, or any other form of encryption that creates a digital signature. In one embodiment, the bits for the software license are added to the hash 114, e.g., concatenated onto the hash 114, and the hash 114 and added software license are both encrypted using PGP encryption. The clearinghouse 102 communicates the signature 118 to the client 104. In one embodiment, a vendor representative communicates the signature 118 to the customer over a telephone. The customer then enters the signature 118 into the client computer 104. In another embodiment, the signature 118 is sent to the client 104 over a network, for example, the Internet. In our case we add extra data and then encrypt the whole packet The client 104, in embodiments, receives the digital signature 118, decrypts the digital signature 118 to extract the reversible hash 115 and reverses the reversible hash 115 to extract the predetermined seed value 124. The decryption engine 120 decrypts the digital signature 118 using a method or system complimentary to the encryption engine 116.

Decrypting the digital signature 118 yields the reversible hash 115, which is the same as the reversible hash 114 encrypted by the clearinghouse 102. The reversible hash 115 operates as the first operand for a first function performed by the reverse hash algorithm component 122.

The reverse hash algorithm component 122 may use one or more items of information from the data packet 106, the software 113, or/and data received from clearinghouse 102 as the operands for one or more other functions. In embodiments, the first function performed by the reverse hash algorithm component 122 is different from the first function preformed by the hash algorithm component 108. Indeed, the reverse hash algorithm component 122 executes a first function that reverses or counters the last function performed by the hash algorithm component 108. For example, if the hash algorithm component 108 completed an addition as the last function, the reverse hash algorithm component 122 completes a subtraction, with the same operands, to achieve an interim hash. As such, the reverse hash algorithm component 122 performs one or more counter functions that are associated with and reverse the one or more functions preformed by the hash algorithm component 108.

After reversing all the functions performed to derive the reversible hash 115, the reverse hash algorithm component 122 outputs a determined seed value 124. The reverse hash algorithm component 122, in embodiments, uses information from the same sources, i.e. the data packet, software, etc., to reverse the reversible hash 115 as the hash algorithm component 108 used to create the reversible hash 114. If the information is the same, the determined seed value 124 will be the same as the seed value 110. However, if the information is different, i.e., the software 113 is pirated and/or an incomplete copy of the software, the determined seed value 124 will be different from the seed value 110 because the functions will perform differently at the client 102.

To determine if the determined seed value 124 is the same as seed value 110, the determined seed value is sent to a compare seed value component 126. In embodiments, the compare seed value component 126 compares the numeric value of the determined seed value 124 to the seed value 110. The comparison may be a bit-by-bit comparison, e.g., the bit in position two (2) is the same for both seed values, or mathematical comparison, for example, subtracting the determined seed value 124 from the seed value 110 to determine if the result is zero. Other comparisons are possible and contemplated. If the determined seed value 124 compares favorably to the seed value 110, the client 104 installs the software 113 and/or executes the software 113.

Figure 2:
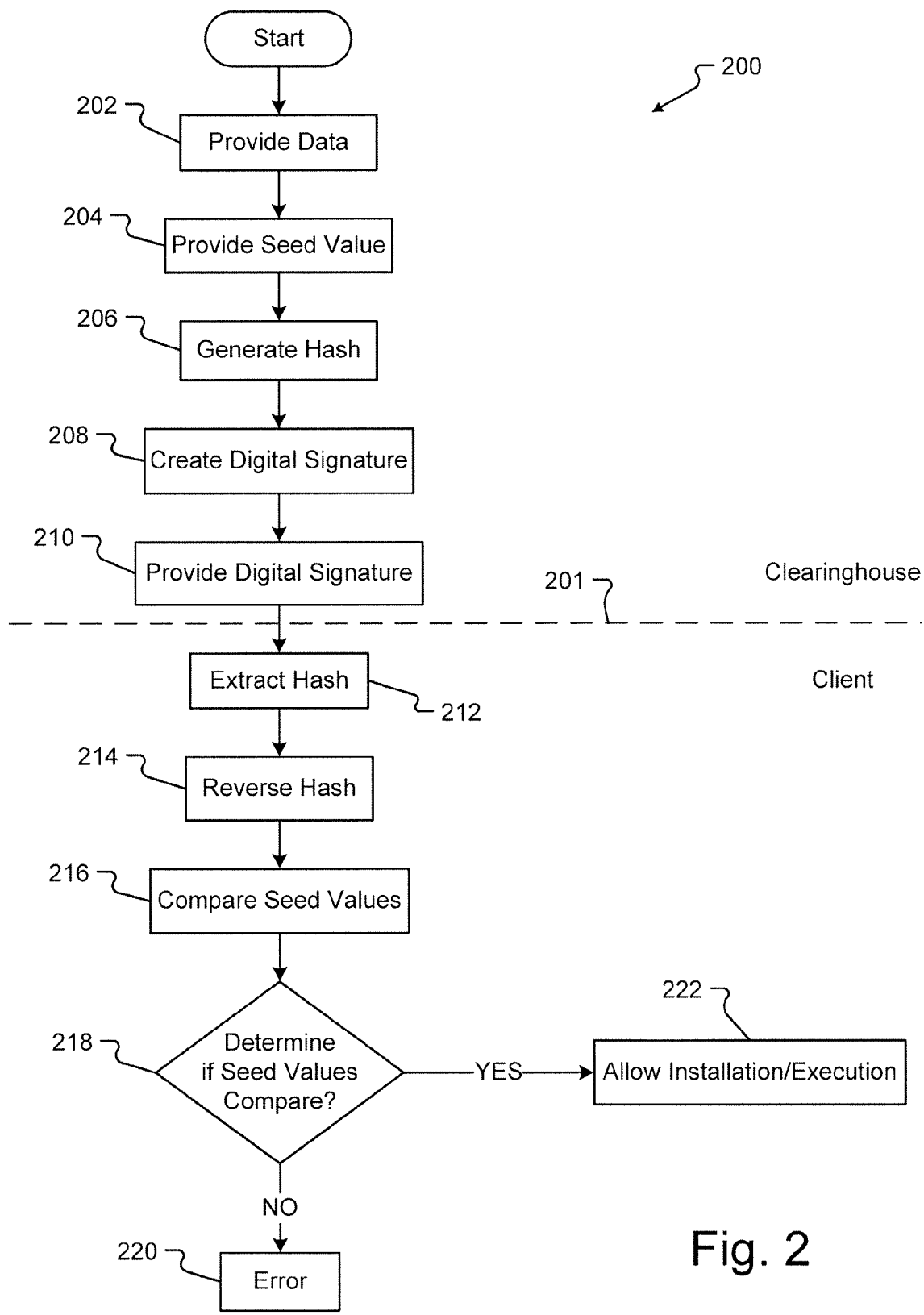
FIG. 2 is a flow diagram of an embodiment of a process for generating and reversing a reversible hash to authenticate a software license.

A method 200 for generating and reversing a hash is shown in FIG. 2. In embodiments, part of the method 200 is executed at the clearinghouse 102 (FIG. 1) and part of the method 200 is executed at the client 104 (FIG. 1), as represented by line 201. Provide operation 202 provides data. In embodiments, the client 104 (FIG. 1) provides a data packet 106 (FIG. 1) to the clearinghouse 102 (FIG. 1). The data packet may include information about the client computer, the customer, the software package to be installed, etc. In one embodiment, the data packet 106 (FIG. 1) is transmitted from the client 104 (FIG. 1) to the clearinghouse 102 (FIG. 1) over a network, for example, the Internet. The data packet 106 (FIG. 1) may also be communicated, over a telephone, to a vendor at the clearinghouse 102 (FIG. 1) and entered into the clearinghouse 102 (FIG. 1). In other embodiments, the data provided is a software package 112 (FIG. 1), which may be partitioned for use in one or more functions as data operands. In an alternative embodiment, other data items are sent from the clearinghouse 102 to the client 104 for use in reversing the hash 115, e.g., the software license. The one or more other data items sent to the client 104 may be data items that are also authenticated.

Provide operation 204 provides a seed value. The seed value 110 (FIG. 1) may be known to the clearinghouse 102 (FIG. 1) because the seed value 110 (FIG. 1) is the same for all software packages 112 (FIG. 1) of the type the client 104 (FIG. 1) wants to install. A hash algorithm component 108 (FIG. 1) may accept the seed value 110 (FIG. 1) as the first operand for one or more functions performed by the hash algorithm component 108 (FIG. 1). In one embodiment, the seed value 110 (FIG. 1) is stored at the clearinghouse 102 (FIG. 1) and is read from a predetermined address of memory storing the software or software license.

Generate operation 206 generates a hash. In embodiments, the hash algorithm component 108 (FIG. 1) executes one or more functions to create the hash 114 (FIG. 1). For example, the hash algorithm component 108 (FIG. 1) performs the logic operation XOR, which is a binary logic operation completed on the seed value or interim hash and a partition of the software or other data. The XOR operation produces a one (1) if the bit in the seed value or interim hash and the complimentary bit in the partition of the software or other data are both zero (0). Other operations of functions, e.g., add, subtract, divide, rotate, shift, etc., are possible and contemplated. The product of the function or operation, performed by the hash algorithm component 108 (FIG. 1), is another interim hash or the final hash 114 (FIG. 1). If the product is an interim hash, the hash algorithm component 108 (FIG. 1) may complete another iteration of the same function or operation or complete different functions or operations using another partition of software or other data and the interim hash. Once the predetermined number of functions or operations is completed, the hash algorithm component 108 (FIG. 1) provides the final reversible hash 114 (FIG. 1).

Create operation 208 creates a digital signature. In one embodiment, an encryption engine 116 (FIG. 1) can encrypt the reversible hash 114 (FIG. 1) to create the digital signature 118 (FIG. 1). Provide operation 210 provides the digital signature 118 (FIG. 1). For example, the clearinghouse 102 (FIG. 1) transmits the reversible hash 114 (FIG. 1) over a network. A vendor at the clearinghouse 102 (FIG. 1) also may communicate the digital signature 118 (FIG. 1) to a customer who enters the digital signature 118 (FIG. 1) into the client 104 (FIG. 1). The client 104 (FIG. 1) receives the digital signature 118 (FIG. 1).

Extract operation 212 extracts the hash. A decryption method related to the encryption method used in create operation 208 decrypts the received digital signature 118 (FIG. 1) and extracts the hash 115 (FIG. 1). The hash 115 (FIG. 1) may then be accepted by the reverse hash algorithm component 122 (FIG. 1).

Reverse operation 214 reverse the hash. In embodiments, the reverse hash algorithm component 122 (FIG. 1) completes a series of operations or counter functions that reverses the functions or operations used to create the hash 115 (FIG. 1). The counter functions occur in the opposite order from the functions that created the hash 115 (FIG. 1). As such, the operations that created hash 115 (FIG. 1) are reversed until a seed value 124 (FIG. 1) is determined.

Compare operation 216 compares the seed values. The seed value 124 (FIG. 1) is, in embodiments, compared with a known seed value 110 (FIG. 1). The comparison may be a bit-for-bit comparison or another comparison method. In one embodiment, a compare seed value component 126 compares the seed values. Determine operation 218 determines if the seed values compare. For example, compare seed value component 126 determines if the seed value 124 (FIG. 1) is the same as seed value 110 (FIG. 1). If the seed values do not compare, the process 200 flows NO to an error 220, and the software is not authorized to execute and/or install.

If the seed values do compare, the process flows YES to allow operation 222. Allow operation 222 allows the installation or execution of the software 113 (FIG. 1). In one embodiment, compare seed value component 126 provides an authorization indicator to the client processor to continue with the installation or execution of the software 113 (FIG. 1).

Figure 3:
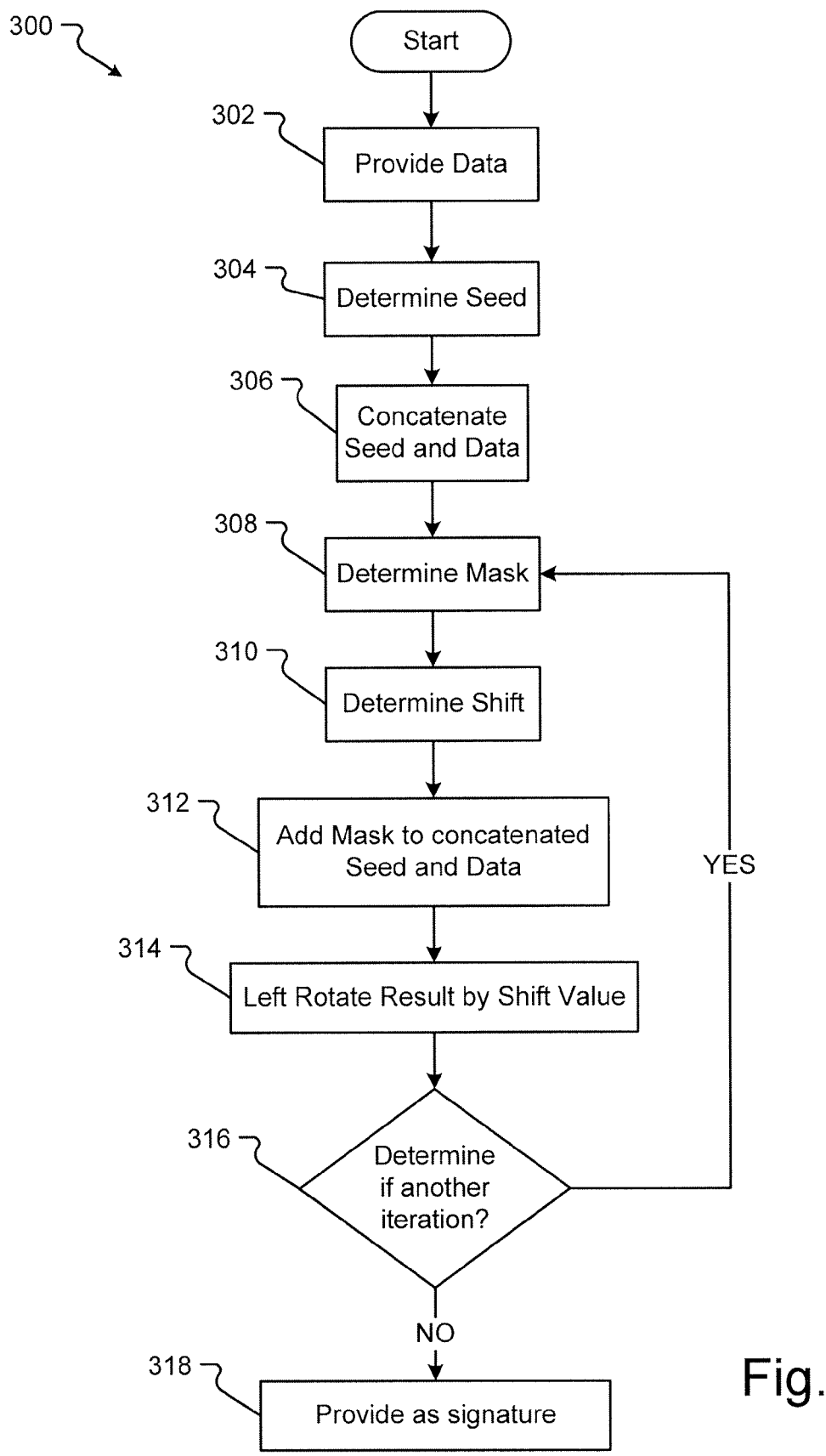
FIG. 3 is a flow diagram of an embodiment of a process for generating a reversible hash to authenticate a software license.
Figure 5:
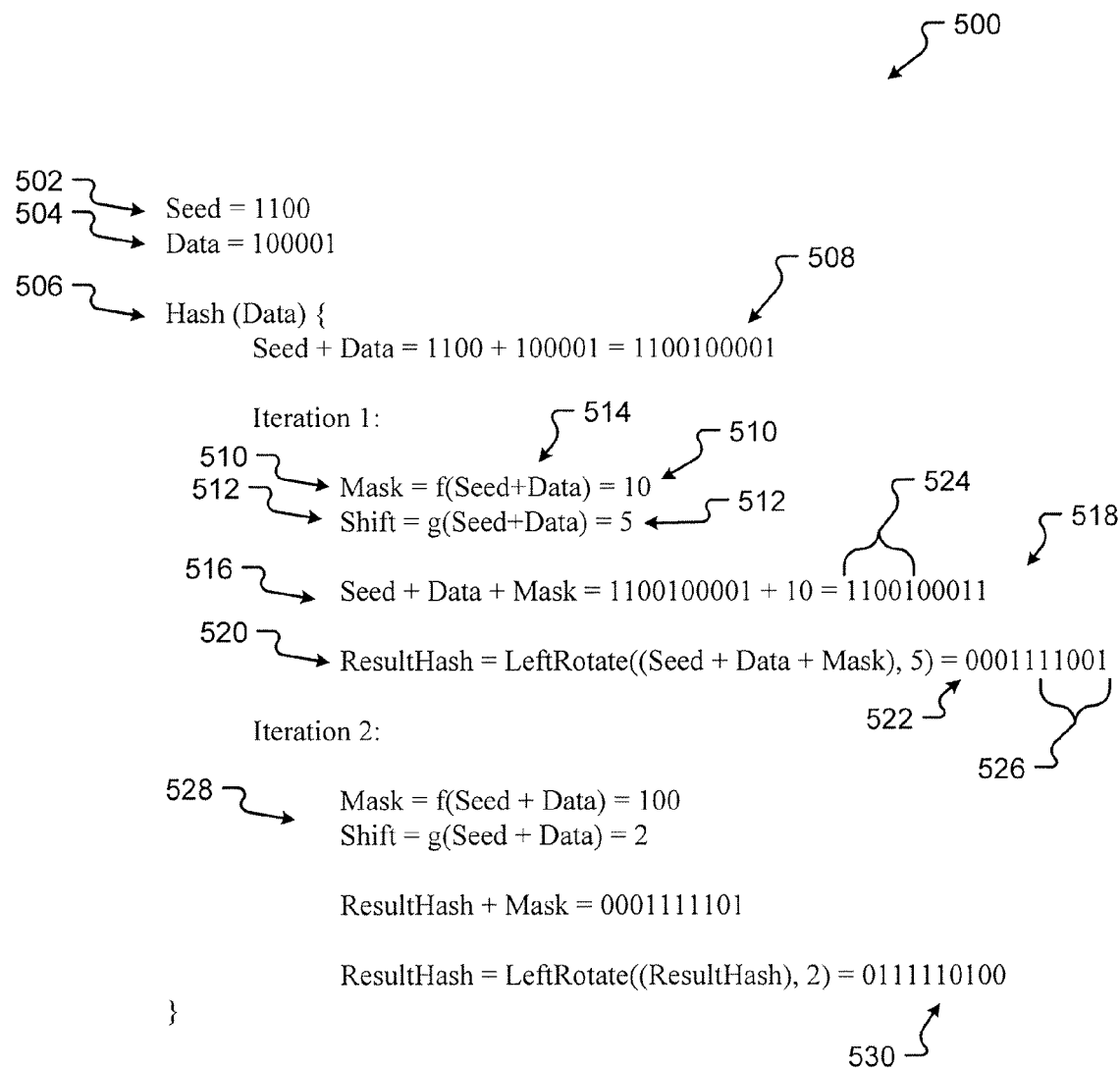
FIG. 5 is an embodiment of pseudo code for generating a reversible hash associated with the process shown in FIG. 3.

An exemplary embodiment method 300 for creating a digital signature is shown in FIG. 3 with associated exemplary pseudo code in 500 FIG. 5. The related exemplary embodiment of a method 400 for reversing the digital signature generated in method 300 is shown in FIG. 5 with associated exemplary pseudo code 600 in FIG. 6. Provide operation 302 provides data for the hash algorithm. For example, data 504 (FIG. 5) is provided in the pseudo code 500 (FIG. 5). In embodiments, the data 504 (FIG. 5) may be a partition of the software, i.e., a six-bit array "100001" from a predetermined address of memory storing the software.

Provide operation 304 provides a seed value. In the example shown in FIG. 5, the seed value 502 is "1100." The seed value 502 (FIG. 5) may be the same and associated with every software package of the same type. In the exemplary embodiment, concatenate operation 306, function 506 (FIG. 5), concatenates the seed 502 (FIG. 5) and the data 504 (FIG. 5) to form a data array 508 (FIG. 5). From the concatenated data 508 (FIG. 5), determine operation 308 determines a mask. For example, the concatenated seed and data 514 (FIG. 5) is an input into determining the mask 510 (FIG. 5). The mask 510 (FIG. 5), in one embodiment, is a two bit array extracted from the software at a memory address defined by the concatenated seed and data 514 (FIG. 5). Determine operation 310 determines a shift value. In the exemplary embodiment, the shift value 512 (FIG. 5) is also determined using the concatenated seed and data 514 (FIG. 5). The shift value 512 (FIG. 5) may be the result of the sum of all the bits extracted from the software at a memory address defined by the concatenated seed and data 514 (FIG. 5).

Add operation 312 adds the mask to the concatenated seed and data as a second function. The binary add function 516 (FIG. 5) generates an interim hash 518 (FIG. 5). As is seen in this example, the functions may be mathematical. Left rotate operation 314 rotates the interim hash by the number of bits specified by the shift value. For example, the first 5 bits 524 (FIG. 5) specified from the shift value 512 (FIG. 5) are moved from the front of the bit array 518 (FIG. 5) to the five bits 526 (FIG. 5) of bit array 522 (FIG. 5). As is shown in this example, the function may also be a bit operation. The bit array 522 (FIG. 5) is the next interim hash.

Determine operation 316 determines if another iteration of the function is required. In one embodiment, the same functions are performed successively for a predetermined number of iterations. Different functions may also be performed in subsequent operations. If there is another iteration, the process 300 flows YES to determine operation 308. As shown generally at 528 (FIG. 5), another iteration of an addition and a right rotate are completed. If there is not another iteration, the process 300 flows NO to provide operation 318. Provide operation 318 provides a signature. In an embodiment, the final hash value 530 (FIG. 5) is encrypted and communicated to a client.

Figure 4:
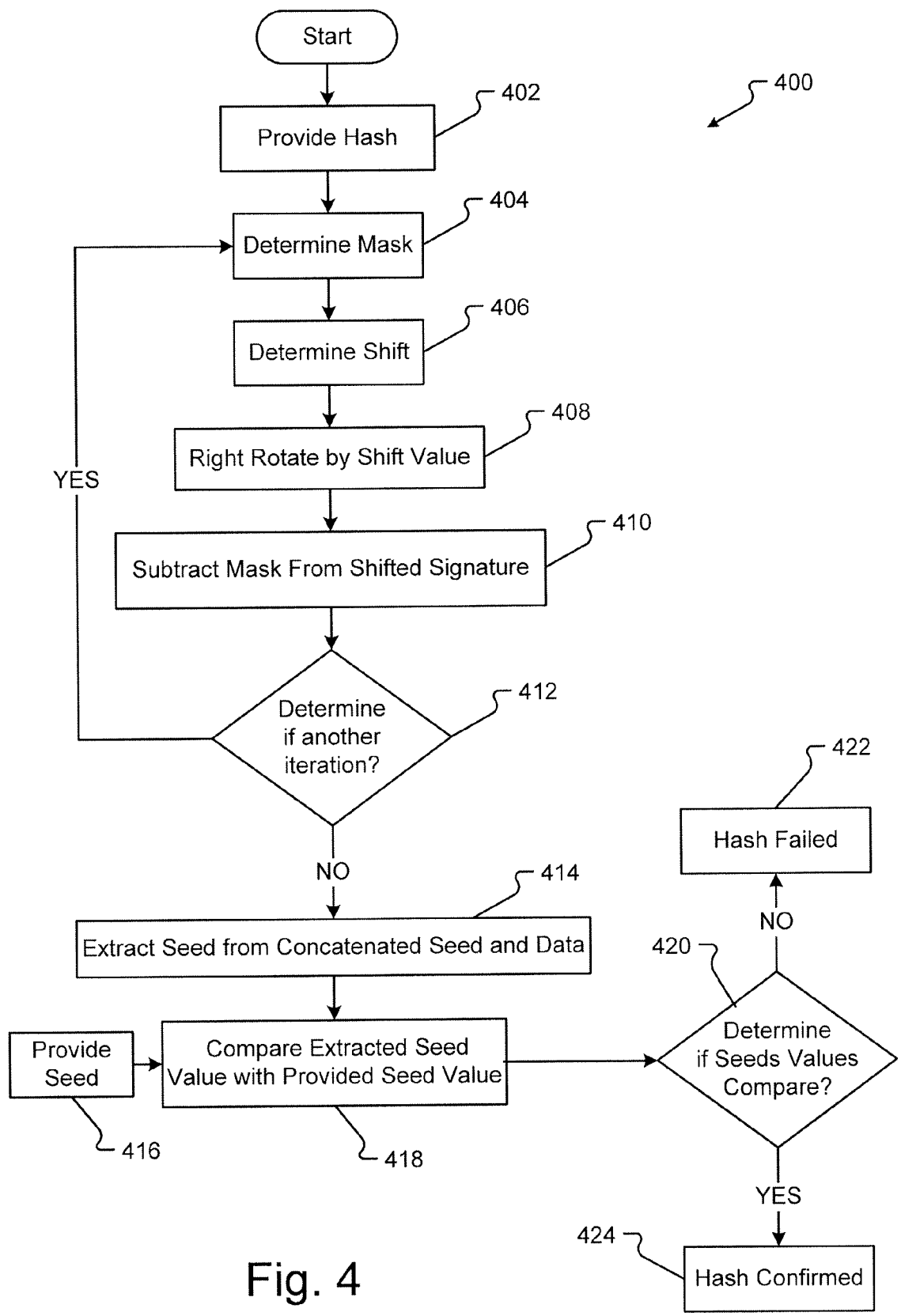
FIG. 4 is a flow diagram of an embodiment of a process for reversing the reversible hash generated by the process shown in FIG. 3.
Figure 6:
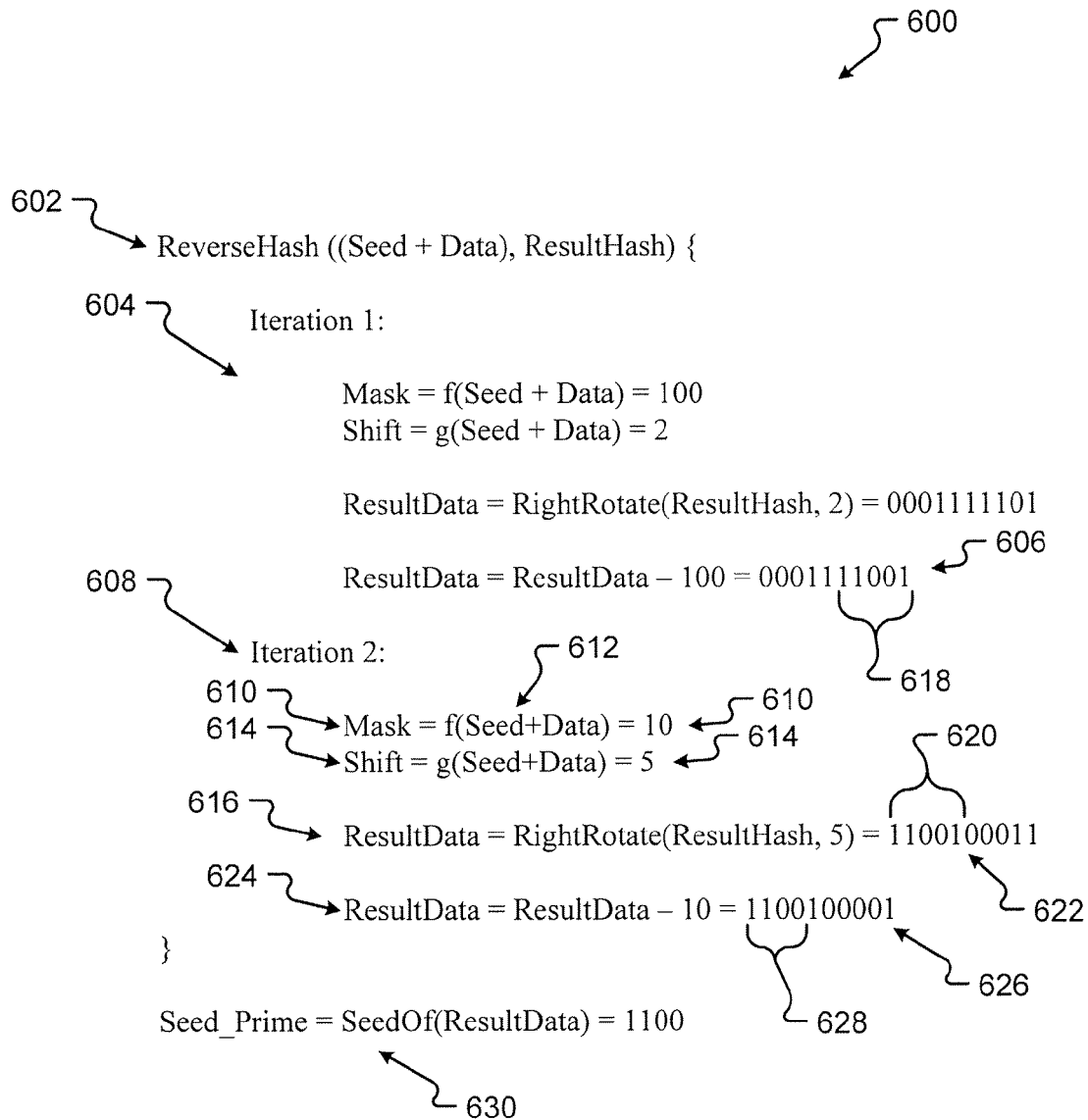
FIG. 6 is an embodiment of pseudo code for reversing the reversible hash associated with the process shown in FIG. 4.

The process 400 for reversing the hash 530 (FIG. 5) is shown in FIG. 4 with associated exemplary pseudo code 600 shown in FIG. 6. Provide operation 402 provides the reversible hash. In embodiments, the digital signature sent to the client is decrypted to extract the reversible hash 530 (FIG. 5).

The hash 530 (FIG. 5) may be the first operand in a reverse hash algorithm 602 (FIG. 6). A first iteration of functions 604 (FIG. 6), in embodiments, reverses the second iteration 528 (FIG. 5) of functions in the hash algorithm 500 (FIG. 5). The first iteration 604 (FIG. 6) of the functions produces an interim hash 606 (FIG. 6). A second iteration 608 (FIG. 6) of functions further "unwinds" the interim hash 606 (FIG. 6) and reverses the first iteration of functions 516 (FIG. 6) and 520 (FIG. 6) in the hash algorithm 500 (FIG. 5). The method 400 shown in FIG. 4 will be explained with reference to the second iteration 608 shown in FIG. 6.

Determine operation 404 determines the mask. In embodiments, the mask is determined with a function that uses the seed and a selection of data as its input. For example, the mask 610 (FIG. 6) uses a concatenated seed value and data selection 612 (FIG. 6) to determine the mask 610 (FIG. 6). The concatenated seed value and data selection 612 (FIG. 6), in embodiments, is the same as the concatenated seed and data input 514 (FIG. 5) in the mask 510 (FIG. 5) of the hash operation 500 (FIG. 5). Thus, the same mask is determined as evidenced by the same value for mask 610 (FIG. 6) and mask 510 (FIG. 5). It should be noted that if the software is different, then the data used to determine the mask 610 (FIG. 6) may be different. As such, the hash would not reverse correctly, and the authorization of the license would fail.

Determine operation 406 determines the shift value. In embodiments, the shift value 614 (FIG. 6) would be determined the same as the shift value 512 (FIG. 5). Again, it should be noted that if the software is different, then the data used to determine the shift value 614 (FIG. 6) may be different. As such, the hash again would not reverse correctly, and the authorization of the license, built on the correct seed value being determined, would fail.

Right rotate operation 408 rotates the interim hash by the number of bits specified in the shift value. As can be seen by the exemplary embodiment 600, the right rotate operation 616 (FIG. 6) reverses or is the counter function to the left rotate function 520 (FIG. 5). In addition, the right rotate operation 616 (FIG. 6) is preformed first before other functions because the left rotate function 520 (FIG. 5) was performed last after all other functions. Thus, the counter functions performed in the reverse hash method 600 (FIG. 6) reverse the functions in the hash method 500 (FIG. 5) and occur in the opposite order of the hash method 500 (FIG. 5). Right rotate operation 616 moves, bit-by-bit, the last five bits 618 (FIG. 6) of the interim hash 606 (FIG. 6) to the front five bits 620 (FIG. 6) of the bit array 622 (FIG. 6). From this example, it can be seen that the output of this counter function 616 (FIG. 6) is the same as the input 518 (FIG. 5) of the corresponding left rotate function 520 (FIG. 5) in the hash method 500 (FIG. 5). In other words, the right rotate function 616 (FIG. 6) reversed the left rotate function 520 (FIG. 5). The right rotate operation 408 produces another interim hash 622 (FIG. 6).

Subtract operation 410 subtracts the mask from the interim hash 622 (FIG. 6). In embodiments, the subtract function 624 (FIG. 6) subtracts the mask 610 (FIG. 6) from the interim hash 622 (FIG. 6). The function 624 (FIG. 6) produces another interim hash 626 (FIG. 6). As with the right rotate operation 408, the subtract operation 624 (FIG. 6) is the counter to and reverses the add operation 516 (FIG. 5). As such, the result of the subtract function 624 (FIG. 6) is the same as the input 508 (FIG. 5) into the add operation 516 (FIG. 5).

Determine operation 412 determines if there is another iteration. The number of iterations, in embodiments, is predetermined and is the same for the hash operation 500 (FIG. 5) and the reverse hash operation 600 (FIG. 6). If there is another iteration, the process 400 flows YES to determine operation 404. If there is no other iteration, the process flows NO to extract operation 414. Extract operation 414 extracts the determined seed from the interim hash, which is concatenated seed and data. As with the concatenated seed and data 508 (FIG. 5), the seed value is the first four bits 628 (FIG. 6) of the interim hash 626 (FIG. 6). The seed value 628 (FIG. 6) is partitioned and separated from the interim hash 626 (FIG. 6).

Provide operation 416 provides the known seed value. The software package the client desires to install or execute, in embodiments, includes the known seed value 502 (FIG. 5) used by the clearinghouse 102 (FIG. 1) to create the final hash 530 (FIG. 5). For example, the seed value is stored as part of the data or code of the software at a known, predetermined memory address in the software. The known seed value 502 (FIG. 5) is provided to the compare operation 418. Compare operation 418 compares the provided seed value with the extracted, determined seed value. In the exemplary embodiment, the compare operation 630 (FIG. 6) compares the extracted seed value 628 (FIG. 6) to the provided seed value 502 (FIG. 5).

Determine operation 420 determines if the seed values compare. If the seed values do compare, the process 400 flows YES to hash confirmed operation 424. If the seed values do not compare, the process 400 flows NO to hash failed operation 422. Hash failed operation 422 fails if the hashes do not compare. In embodiments, an error message is produced and/or the software fails to install or execute. Hash confirmed operation 424 confirms the hash. For example, an authorization is produced to continue or complete the software installation or to execute the software.

One skilled in the art will recognize that the embodiments described in FIGS. 3, 4, 5, and 6 are not meant to be limiting in nature. Other functions, order of the functions, number of iterations and other changes are possible. In other embodiments, the hash algorithm is an MD5 algorithm completed twice without an XOR of the hash and the data. Likewise, the reverse hash algorithm reverses the MD5 algorithm used to create the hash.

Figure 7:
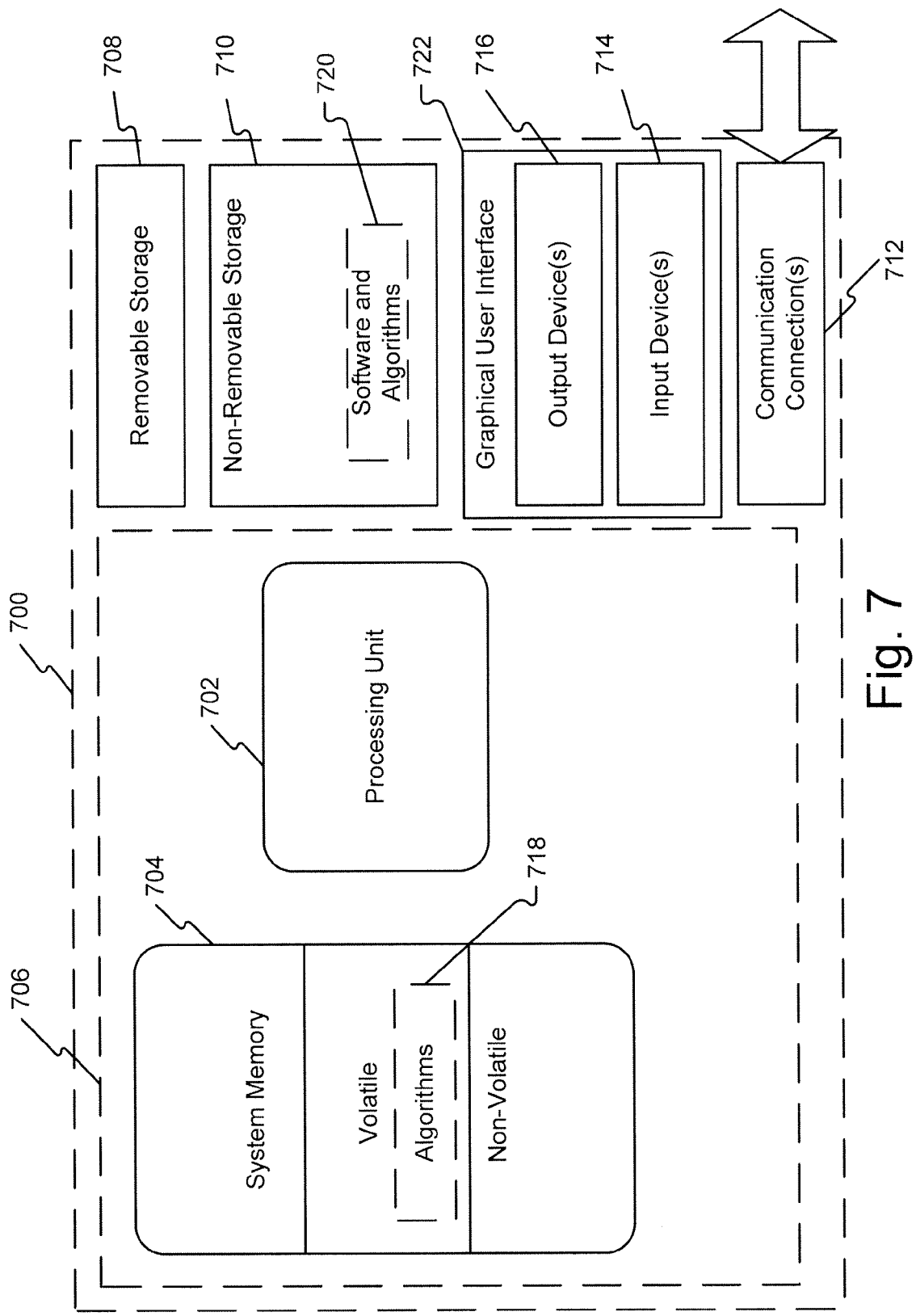
FIG. 7 is a block diagram of an embodiment of a computing system operable for generating reversible hashes or for reversing the reversible hash of a software license.

With reference to FIG. 7, an embodiment of a computing environment for implementing the embodiments described herein is shown. In one embodiment, the clearinghouse 102 (FIG. 1) is a server at a software vendor's facility while the client 104 is a server, desktop, laptop, handheld device, or other computing system executing software for the customer. Embodiments of the computer environment for the clearinghouse and the client include a computer system, such as computer system 700. In one embodiment, the client computer desires to install or execute a software package 113 (FIG. 1), while the hash algorithm component 108 (FIG. 1) executes on a server and sends a digital signature that authorizes the installation of the software package 113 (FIG. 1). As such, a basic computer system applicable to both of these environments is described hereinafter.

In its most basic configuration, computer system 700 typically includes at least one processing unit 702 and system memory 704. In embodiments, either a hash algorithm component or reverse hash algorithm component, generally indicated by 718, is loaded into and run by the processing unit 702 from system memory 704 of either a clearinghouse or a client computer. Depending on the exact configuration and type of computer system 700, memory 704 may be volatile (such as RAM), non-volatile (such as ROM, flash memory, etc.), or some combination of the two. This most basic configuration of the computer system 700 is illustrated in FIG. 7 by dashed line 706.

Additionally, device 700 may also have additional features/functionality. For example, device 700 includes additional storage (removable and/or non-removable) including, but not limited to, magnetic or optical disks or tape. Such additional storage is illustrated in FIG. 7 by removable storage 708 and non-removable storage 710. In embodiments, a hash algorithm component or reverse hash algorithm component, software to be installed, data, or seed values, generally indicated by 720, is stored in non-removable storage 710, although the hash algorithm component or reverse hash algorithm component, software to be installed, data, or seed values 720 may be saved into removable storage 708, and loaded into system memory 704 for use by or for execution by the processing unit 702 on the clearinghouse or client. In some embodiments, the hash algorithm component or the reverse hash algorithm component, software to be installed, data, or seed values 720 is one of several components of a software license authentication system 100 (FIG. 1). Computer storage media includes volatile and nonvolatile, removable and non-removable media implemented in any method or technology for storage of information such as computer readable instructions, data structures, program modules, or other data.

Memory 704, removable storage 708, and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, for example, the software package data 113 (FIG. 1) or the seed values 110 (FIG. 1), and which is accessed by device 700 and processor 702 on either the clearinghouse or the client computer. Any such computer storage media may be part of device 700.

Device 700 may also contain communications connection(s) 712 that allow the device to communicate with other devices. In embodiments, the communication connections 712 are used to send and/or receive data packets 106 (FIG. 1), send and/or receive digital signatures 118 (FIG. 1) with a service executed on both the clearinghouse server and the client that is accessed over a network, such as the Internet. Communications connection(s) 712 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

In embodiments, device 700 includes a graphical user interface 722 that includes input devices 714 and output devices 716. Data selections for the data packet 106 (FIG. 1), in embodiments, are selected with user input device(s) 714, and the data 106 (FIG. 1) are displayed with output device(s) 716. Input device(s) 714 are also referred to as user interface selection devices and include, but are not limited to, a keyboard, a mouse, a pen, a voice input device, a touch input device, etc. Output device(s) 716 are also referred to as displays and include, but are not limited to, cathode ray tube displays, plasma screen displays, liquid crystal screen displays, speakers, printers, etc. These devices, either individually or in combination, form the graphical user interface 722 used to display data as described herein. All these devices are well know in the art and need not be discussed at length here.

Computer system 700 typically includes at least some form of computer readable media. Computer readable media can be any available media that can be accessed by processing unit 702. By way of example, and not limitation, computer readable media comprise computer storage media and communication media. Software license system 100 (FIG. 1) and the algorithms 718 comprise such modules or instructions executable by computer system 700 that may be stored on computer storage medium and other tangible mediums and transmitted in communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

In some embodiments, computer system 700 is part of a network that stores data in remote storage media for use by the computing system 700. In embodiments, a reverse hash algorithm 718 executing on a client system may access the remotely stored data, for example, the known seed value, to compare seed values. In other embodiments, the computing system 700 is a desktop or similar computer that stores and operates the reverse hash algorithm 718 on local client data stored in a local storage medium. In still other embodiments, the reverse hash algorithm 718 is executed remotely on a server computer system, wherein compare results are returned to a client computer system but not generated on the client computer system.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer storage medium, wherein the storage medium does not consist of a propagated data signal, encoding computer executable instructions that, when executed a processor, perform a method for providing verification of a digital signature associated with a software license, the method comprising:
   receiving an original seed value, wherein the original seed value is the same for all software packages of the same type;
   providing one or more items of data related to the customer;
   receiving providing a digital signature;
   extracting a reversible hash value from the digital signature;
   reversing the reversible hash to obtain a determined seed value, wherein the one or more items of data related to the customer are used to reverse the reversible hash;
   comparing the determined seed value to the original seed value; and
   if the determined seed value compares to the original seed value, verifying the signature and the associated software license.

2. The computer storage medium defined in claim 1, wherein the original seed value is known to both a client and a clearinghouse.

3. The computer storage medium defined in claim 1, wherein the original seed value is the same for all software of a same type, wherein the software is associated with the software license.

4. The computer storage medium defined in claim 1, wherein providing a digital signature comprises sending the digital signature from a clearinghouse to a client.

5. The computer storage medium defined in claim 1, wherein providing a digital signature comprises:
   a vendor communicating the digital signature to a customer over a telephone; and
   the customer entering the digital signature into a client.

6. The computer storage medium defined in claim 1, wherein extracting a hash reversible value from the digital signature comprises decrypting the digital signature to obtain the hash reversible value.

7. The computer storage medium defined in claim 1, wherein one or more counter functions are associated with and reverse one or more functions executed to create the reversible hash value.

8. The computer storage medium defined in claim 7, wherein the one or more functions are a modified MD5 algorithm executed twice, and wherein the counter functions reverse the MD5 algorithm.

9. The computer storage medium defined in claim 7, wherein both the one or more functions and the one or more counter functions use the same data as operands.

10. The computer storage medium defined in claim 7, wherein the associated one or more counter functions are executed in reverse order from the one or more functions.

11. The computer storage medium defined in claim 1, further comprising allowing installation of software associated with the software license.

12. A computer storage medium, wherein the storage medium does not consist of a propagated data signal, encoding computer executable instructions that, when executed by a processor, perform a method for providing a reversible digital signature associated with a software license, the method comprising:
   receiving a seed value, wherein the seed value is the same for all software packages of the same type;
   receiving at least one other item of information related to the customer;
   generating a reversible hash from a first function with the seed value as a first operand and at least one other item of information related to the customer as the second operand, wherein the reversible hash is operable to be reversed at a client using a counter function that reverses the first function;
   encrypting the reversible hash to create a digital signature; and
   providing the digital signature to a client, wherein the client reverses the reversible hash using the at least one other item of information related to the customer to verify the software license.

13. The computer storage medium defined in claim 12, wherein the seed value is known for all software associated with the software license.

14. The computer storage medium defined in claim 13, wherein the seed value is read from a predetermined memory address in the software.

15. The computer storage medium defined in claim 12, wherein the at least one other item of information is one of a customer's identity, a customer's address, one or more descriptors of a computer used by a customer, a software package the customer wants to install, a time, a date, a store at which the customer purchased the software package, or a portion of software.

16. The computer storage medium defined in claim 12, wherein the reversible hash is created by a modified MD5 algorithm.

17. A system for verifying a digital signature associated with a software license, the system comprising:
  a processor; and
  a memory storing components executed by the processor, the components comprising:
  a reverse hash algorithm component, the reverse hash algorithm component operable to receive a reversible hash, to execute one or more counter functions operating on data from one of a data packet comprising information related to a customer, or a software to extract a determined seed value from the reversible hash;
  a compare seed value component in electrical communication with the reverse hash algorithm component, the compare seed value component operable to receive the determined seed value, to receive the known seed value, to compare the determined seed value to the known seed value, and to verify authenticity of the software license if the determined seed value compares to the known seed value, wherein the known seed value is the same for all software packages of the same type; and
  a decryption engine in electrical communication with the reverse hash algorithm component, the decryption engine operable to receive a digital signature, to decrypt the digital signature to extract the reversible hash, and to provide the reversible hash to the reverse hash algorithm component.

18. The system defined in claim 17, further comprising a clearinghouse in electrical communication with the reverse hash algorithm component, wherein the clearinghouse comprises:
  a hash algorithm component, the hash algorithm component operable to execute one or more functions to generate the reversible hash from the known seed value and the data from one of the data packet or the software and to provide the reversible hash.

19. The system defined in claim 18, wherein the hash algorithm component and the reverse hash algorithm component execute a same number of functions, wherein the counter functions executed by the reverse hash algorithm component reverse the functions executed by hash algorithm component, and wherein the counter functions are executed in reverse order from the functions executed by the hash algorithm component.

* * * * *